Patented Sept. 19, 1939

2,173,423

UNITED STATES PATENT OFFICE 2,173,423

CARBONIC ACID DERIVATIVES

Karl Miescher, Riehen, and Hans Kaegi, Basel, Switzerland, assignors to the firm Society of Chemical Industry in Basle, Basel, Switzerland No Drawing. Application December 14, 1937, Serial No. 179,784. In Switzerland December 24, 1936

6 Claims. (Cl. 260—397)

It has been found that new carbonic acid derivatives of saturated and unsaturated hydroxy-ketones of the type of the androstane-ol-ones can be obtained by causing these hydroxy-ketones to react with reactive carbonic acid derivatives.

The expression reactive carbonic acid derivatives as above used is understood to include for example carbonic acid halides such as phosgene, halogen carbonic esters, urea halides, as well as isocyanates. In the halogen carbonic esters of the above hydroxy-ketones obtainable by using carbonic acid halides the halogen can be replaced by other groups, if desired, for example, alcohols, amines, amino alcohols, basic amines and the like.

The new compounds are to be used in therapeutics.

The following examples illustrate the invention, the parts being by weight:—

Example 1

1.4 parts of $\Delta^4$-androstene-3-one-17-ol are dissolved in 5 parts of chloroform and 2 parts of phosgene are introduced into this solution while cooling well. After allowing the mixture to stand for several hours in the cold and at room temperature the solvent and the phosgene in excess are evaporated in a vacuum and the residue is redissolved from isopropylether. The chlorocarbonic ester of the $\Delta^4$-androstene-3-one-17-ol forms brilliant prisms melting at 139–140° C. with decomposition.

Starting from trans-dehydroandrosterone, the chlorocarbonic ester of the $\Delta^5$-androstene-17-one-3-ol of melting point 126–127° C. can be obtained in similar manner.

Example 2

A solution of 0.35 part of $\Delta^4$-androstene-3-one-17-ol-chlorocarbonic ester in 1 part of benzene is mixed with 0.05 part of methanol and then with 0.1 part of pyridine. When the reaction is complete the whole is poured into water and the benzene solution is separated. After evaporating the solvent there is obtained the $\Delta^4$-androstene-3-one-17-ol-methyl-carbonate which, when recrystallized from isopropylether, melts at 141.5–142.5° C.

The following esters of the carbonic acid can be produced in analogous manner:—$\Delta^4$-androstene-3-one-17-ol-ethyl-carbonate of melting point 142° C.; $\Delta^4$-androstene-3-one-17-ol-n-propyl-carbonate of melting point 87–88° C.; $\Delta^4$-androstene-3-one-17-ol-phenyl-carbonate of melting point 144–145° C.; $\Delta^4$-androstene-3-one-17-ol-benzyl-carbonate of melting point 156–157° C.

Example 3

A solution of 0.7 part of $\Delta^4$-androstene-3-one-17-ol-chloro-carbonate in 3 parts of benzene is mixed with a solution of 0.5 part of $\beta$-diethyl-amino-ethanol in 3 parts of benzene. After allowing the whole to stand for some time the reaction is complete. Water is then added to the mixture and the benzene layer is separated. The latter is washed, dried and evaporated. The oily residue is dissolved in ether and mixed with etheral hydrochloric acid. The hydrochloride of the $\Delta^4$-androstene-3-one-17-ol-$\beta$-diethylamino-ethyl-carbonate which has separated is recrystallized from acetone-isopropylether. It forms crystals which are very easily soluble in water and melt at 178–180° C.

Example 4

A solution of the $\Delta^4$-androstene-3-one-17-ol-chloro-carbonate in benzene is treated with an excess of ammonia gas. After washing the benzene solution is evaporated and the $\Delta^4$-androstene-3-one-17-ol-carbaminate which is left is recrystallized from methyl alcohol. It forms crystals of melting point 160–161° C.

In analogous manner there is produced the $\Delta^4$-androstene-3-one-17-ol-N-n-propyl-carbaminate of melting point 190–191.5° C. when starting from $\Delta^4$-androstene-3-one-17-ol-chloro-carbonate and n-propylamine, and the $\Delta^5$-androstene-17-one-3-ol-carbaminate of melting point 207–208° C. when starting from $\Delta^5$-androstene-17-one-3-ol-chloro-carbonate and ammonia.

In similar manner there is also obtained for example testosterone-17-diethylamino-ethyl-carbaminate.

Example 5

5.81 parts of testosterone are dissolved in 40 parts of benzene and 20 parts of pyridine and 2.5 parts of chloro-carbonic acid-ethylester are added to this solution. When the reaction is complete the whole is worked up as described in Example 2, and there is thus obtained the $\Delta^4$-androstene-3-one-17-ol-ethyl-carbonate of melting point 142° C.

In similar manner there may be produced the following esters:—$\Delta^5$-androstene-17-one-3-ol-methyl-carbonate of melting point 194–196° C.; $\Delta^5$-androstene-17-one-3-ol-phenyl-carbonate of melting point 170–172° C.; $\Delta^5$-androstene-17-one-3-ol-benzyl-carbonate of melting point 159–160.5°

C. as well as corresponding derivatives of the androstane-17-one-3-ol- or androstane-3-one-17-ol.

What we claim is:

1. The carbonic acid derivatives of saturated and unsaturated androstane-ol-ones.
2. The carbonic acid derivatives of testosterone.
3. The chloro-carbonic ester of testosterone of melting point 139–140° C.
4. The testosterone-17-alkyl-carbonate.
5. Testosterone-17-diethylamino-ethyl-carbonate, forming a hydrochloride of melting point 178–180° C.
6. Testosterone-17-n-propyl-carbonate of melting point 87–88° C.

KARL MIESCHER.
HANS KAEGI.